United States Patent
Marum et al.

(10) Patent No.: US 10,475,041 B2
(45) Date of Patent: Nov. 12, 2019

(54) RETAIL PRODUCT INTERACTION DRIVEN CUSTOMER RELATIONSHIP MANAGEMENT

(71) Applicant: SugarCRM Inc., Cupertino, CA (US)

(72) Inventors: Matthew Marum, Raleigh, NC (US); Wes Moran, Merrimack, NH (US)

(73) Assignee: SUGARCRM INC., Cupertino, CA (US)

( * ) Notice: Subject to any disclaimer, the term of this patent is extended or adjusted under 35 U.S.C. 154(b) by 1186 days.

(21) Appl. No.: 14/672,940

(22) Filed: Mar. 30, 2015

(65) Prior Publication Data
US 2016/0292693 A1 Oct. 6, 2016

(51) Int. Cl.
G06Q 10/00 (2012.01)
G06Q 30/00 (2012.01)
G06Q 30/02 (2012.01)

(52) U.S. Cl.
CPC ......... *G06Q 30/01* (2013.01); *G06Q 30/0201* (2013.01)

(58) Field of Classification Search
None
See application file for complete search history.

(56) References Cited

U.S. PATENT DOCUMENTS

| | | | | | |
|---|---|---|---|---|---|
| 6,151,582 | A | * | 11/2000 | Huang | G06Q 10/06 705/7.25 |
| 2002/0143598 | A1 | * | 10/2002 | Scheer | G06Q 10/06 705/7.26 |
| 2011/0218888 | A1 | * | 9/2011 | Fuisz | G06Q 10/0637 705/27.1 |
| 2013/0179440 | A1 | * | 7/2013 | Gordon | G06Q 10/06 707/731 |
| 2014/0165614 | A1 | * | 6/2014 | Manning | F25D 29/00 62/62 |
| 2014/0180793 | A1 | * | 6/2014 | Boal | G06Q 30/0245 705/14.43 |

(Continued)

OTHER PUBLICATIONS

McKay, Lauren, CRM and the iPhone, Mar. 1, 2009, Destination CRM, https://www.destinationcrm.com/Articles/Editorial/Magazine-Features/CRM-and-the-iPhone-53250.aspx?CategoryID=274, p. 1-8.*

*Primary Examiner* — Joseph M Waesco
(74) *Attorney, Agent, or Firm* — Steven M. Greenberg, Esq.; Shutts & Bowen LLP

(57) ABSTRACT

Embodiments of the present invention provide a method, system and computer program product for customer-product interaction driven CRM. In an embodiment of the invention, the method includes detecting an orientation change of a unit of a product so as to indicate the unit being held by a customer, for instance based upon data values read from an accelerometer affixed to the unit of product. The method also includes timing a duration in which the unit is held by the customer, and in response to the duration exceeding a threshold period of time, executing a CRM action in a CRM application with respect to the product and customer. In this regard, as an example the CRM action can be a message transmitted to a mobile device associated with the customer, or as another example, the CRM action can be a message transmitted to a sales representative geographically proximate to the customer.

18 Claims, 2 Drawing Sheets

(56) References Cited

U.S. PATENT DOCUMENTS

| | | | |
|---|---|---|---|
| 2014/0324611 A1* | 10/2014 | Burkhart | G06Q 30/06 |
| | | | 705/21 |
| 2016/0055360 A1* | 2/2016 | Haugarth | G06Q 30/0201 |
| | | | 340/10.1 |
| 2016/0078466 A1* | 3/2016 | Markowitz | G06Q 30/0233 |
| | | | 705/14.33 |
| 2016/0098736 A1* | 4/2016 | McDowall | G06Q 30/0202 |
| | | | 705/7.31 |
| 2016/0171516 A1* | 6/2016 | Brosnan | G06Q 30/0214 |
| | | | 705/14.16 |
| 2016/0171539 A1* | 6/2016 | Ganduri | G06Q 30/0255 |
| | | | 705/14.53 |
| 2016/0180363 A1* | 6/2016 | Burkhart | G06Q 30/0207 |
| | | | 705/14.1 |
| 2016/0267503 A1* | 9/2016 | Zakai-or | G06Q 10/00 |
| 2017/0039617 A1* | 2/2017 | Wind, III | G06Q 30/0617 |
| 2017/0083386 A1* | 3/2017 | Wing | G06F 9/542 |

* cited by examiner

RETAIL PRODUCT INTERACTION DRIVEN CUSTOMER RELATIONSHIP MANAGEMENT

BACKGROUND OF THE INVENTION

Field of the Invention

The present invention relates to customer relationship management (CRM) and more particularly to the utilization of CRM in a retail setting.

Description of the Related Art

CRM refers to the interaction that a business entity enjoys with its customers, whether the business entity provides sales or services to the customer. CRM is often thought of as a business strategy that enables business managers to understand the customer, to retain customers through better customer experience, to attract new customers, increase profitability and to decrease customer management costs. In real terms, however, CRM systems are used specifically to manage business contacts, clients, contract wins and sales leads. As such, CRM solutions provide the end user with the customer business data necessary to provide services or products desired by the customers, to provide better customer service, to cross-sell and to up-sell more effectively, to close deals, retain current customers and understand the identity of the customer.

CRM systems are often used to manage the entire lifecycle of a relationship between a customer and an organization. In this regard, a CRM system is enabled to manage tasks for organizational representatives associated with the targeting and acquisition of a new customer, the fulfillment of a sale to a new customer or an existing customer, and the maintenance of a relationship with an existing customer. Much of the role of the CRM system is to store data documenting the relationship between representatives of an organization and its customers and prospective customers. Thus, the typical CRM system takes a long view of the customer relationship from inception to conclusion which may last many years or even decades.

The use of a CRM system in the in-store retail setting generally is limited to data collection and transaction processing. In this regard, to the extent that a point of sale system within a store has been adapted to communicate with a CRM system, the point of sale system typically receives contact and billing information for a customer at checkout, and additionally reports the nature of the products purchased to the CRM system subsequent to checkout. Optionally, targeted couponing is included as part of the CRM to point of sale integration. Little more of the CRM system is utilized in the in-store setting. Consequently, substantial advantages afforded by CRM have not readily translated to the retail setting.

BRIEF SUMMARY OF THE INVENTION

Embodiments of the present invention address deficiencies of the art in respect to retail deployed CRM and provide a novel and non-obvious method, system and computer program product for customer-product interaction driven CRM. In an embodiment of the invention, a customer-product interaction driven CRM method includes detecting an orientation change of a unit of a product so as to indicate the unit being held by a customer, for instance based upon data values read from an accelerometer affixed to the unit of product. The method also includes timing a duration in which the unit of the product is held by the customer, and in response to the duration exceeding a threshold period of time, executing a CRM action in a CRM application with respect to the product and the customer. In this regard, as an example the CRM action can be a message transmitted to a mobile device associated with the customer, or as another example, the CRM action can be a message transmitted to a sales representative geographically proximate to the customer.

Optionally, the method can include computing for multiple different customers having purchased a unit of the product, an average duration of time during which the multiple different customers held a unit of the product before purchasing a unit of the product setting the threshold period of time to be less than the average duration. In one aspect of the embodiment, the method further can include counting a number of times the customer holds the unit of the product over a duration of time and in response to the number of times exceeding a threshold value, executing a CRM action in the CRM application with respect to the product and the customer. As such, as another option the method can include computing for multiple different customers having purchased a unit of the product, an average duration of time during which the multiple different customers held a unit of the product before purchasing a unit of the product and setting the threshold period of time to be more than the average duration.

In another embodiment of the invention, a CRM data processing system is configured for customer-product interaction driven CRM. The system includes a host computing system including at least one computer with memory and at least one processor. The system also includes a CRM application executing in the memory of the host computing system. Finally, the system includes a customer-product interaction driven CRM module coupled to the CRM application. The module includes program code that when executes in the memory of the host computing system, detects an orientation change of a unit of a product so as to indicate the unit being held by a customer, times a duration in which the unit of the product is held by the customer, and, responds to the duration exceeding a threshold period of time, by executing a CRM action in a CRM application with respect to the product and the customer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for customer-product interaction driven CRM. In accordance with an embodiment of the invention, the interactions of a customer with a unit of product in a retail setting can be monitored. Namely, a period of time during which the customer holds the unit of product, or the number of times the customer holds the product can be monitored. Based upon the measurement of customer-product interactions with respect to the customer and the unit of product, one or more CRM actions can be triggered, for instance if the customer holds the unit product beyond a threshold period of time, a message can be transmitted to a mobile device of the customer in an attempt to educate or motivate the customer to purchase the product, or a message can be transmitted to a mobile device of a sales representative proximate to the customer so as to encourage an interaction between the sales representative and the customer.

Figure 1:
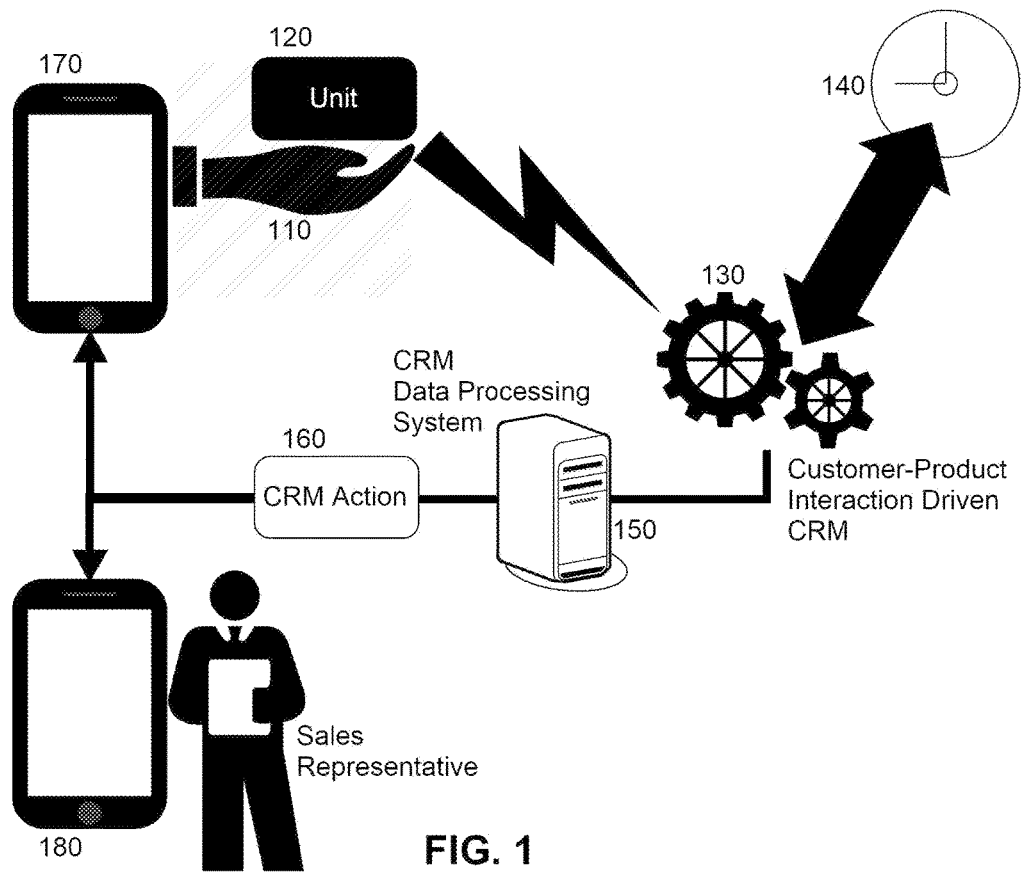
FIG. 1 is a pictorial illustration of a process for customer-product interaction driven CRM.

In further illustration, FIG. 1 pictorially shows a process for customer-product interaction driven CRM. As shown in FIG. 1, customer-product interaction driven CRM logic 130 can detect the handling of a unit of product 120 by a customer 110. The customer-product interaction driven CRM logic 130 can track a duration of time 140 in which the unit of product 120 is handled by the customer 110. Thereafter, in response to a determination by the customer-product interaction driven CRM logic 130 that the duration of time 140 has exceeded a threshold value, the customer-product interaction driven CRM logic 130 can direct a CRM data processing system 150 to trigger a CRM action 160 with respect to the unit of product 120. For instance, the CRM action 160 can be a message to the mobile device 170 of the customer 110, or the CRM action 160 can be a message to a mobile device 180 of a sales representative. The message can include product information pertaining to the unit of product 120, a coupon for the unit of product 120, to name two possibilities.

Figure 2:
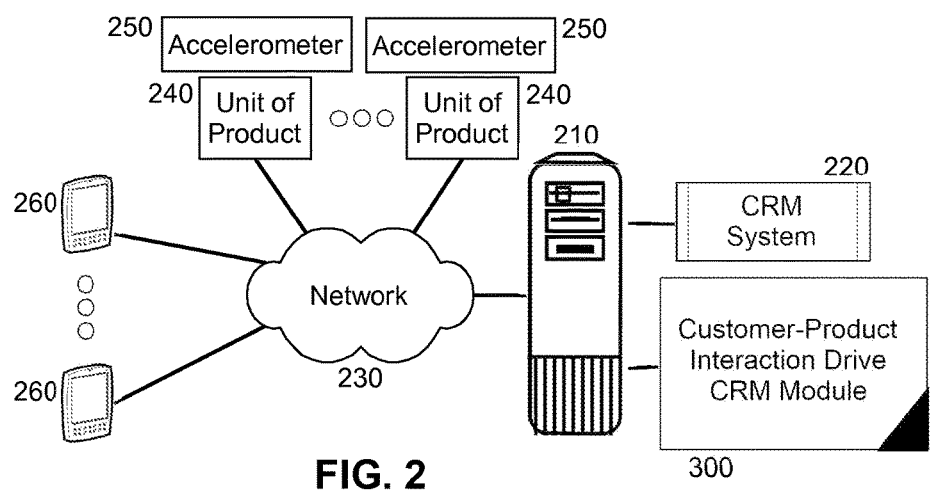
FIG. 2 is a schematic illustration of a CRM data processing system configured for customer-product interaction driven CRM; and, FIG. 3 is a flow chart illustrating a process for customer-product interaction driven CRM.

The process described in connection with FIG. 1 can be implemented in a CRM data processing system. In yet further illustration, FIG. 2 schematically illustrates a CRM data processing system configured for customer-product interaction driven CRM. The system includes a host computing system 210 that includes one or more computers, each with memory and at least one processor. The host computing system 210 can support the execution of a CRM system 220 providing CRM services to different mobile devices 260 over a computer communications network 230. Of note, the CRM system 220 can be communicatively coupled to different units of product 240 over the computer communications network 230. In this regard, the CRM system 220 can receive data from different accelerometers 250 respectively affixed to different ones of the units of product 240.

Of note, a customer-product interaction drive CRM module 300 is coupled to the CRM system 220. The customer-product interaction drive CRM module 300 includes program code enabled upon execution in the memory of the host computing system 210 to process the received data from the different accelerometers 250 so as to determine whether or not one of the units of product 240 is contemporaneously handled by a customer, a duration of time during which the one of the units of product 240 is handled by the customer, and even a number of times the one of the units of product 240 has been handled over time by customer. The program code of the customer-product interaction drive CRM module 300 also is enabled to direct the CRM system 220 to trigger a CRM action in response to a duration of time exceeding a threshold value, or the number of times exceeding a threshold value.

Figure 3:
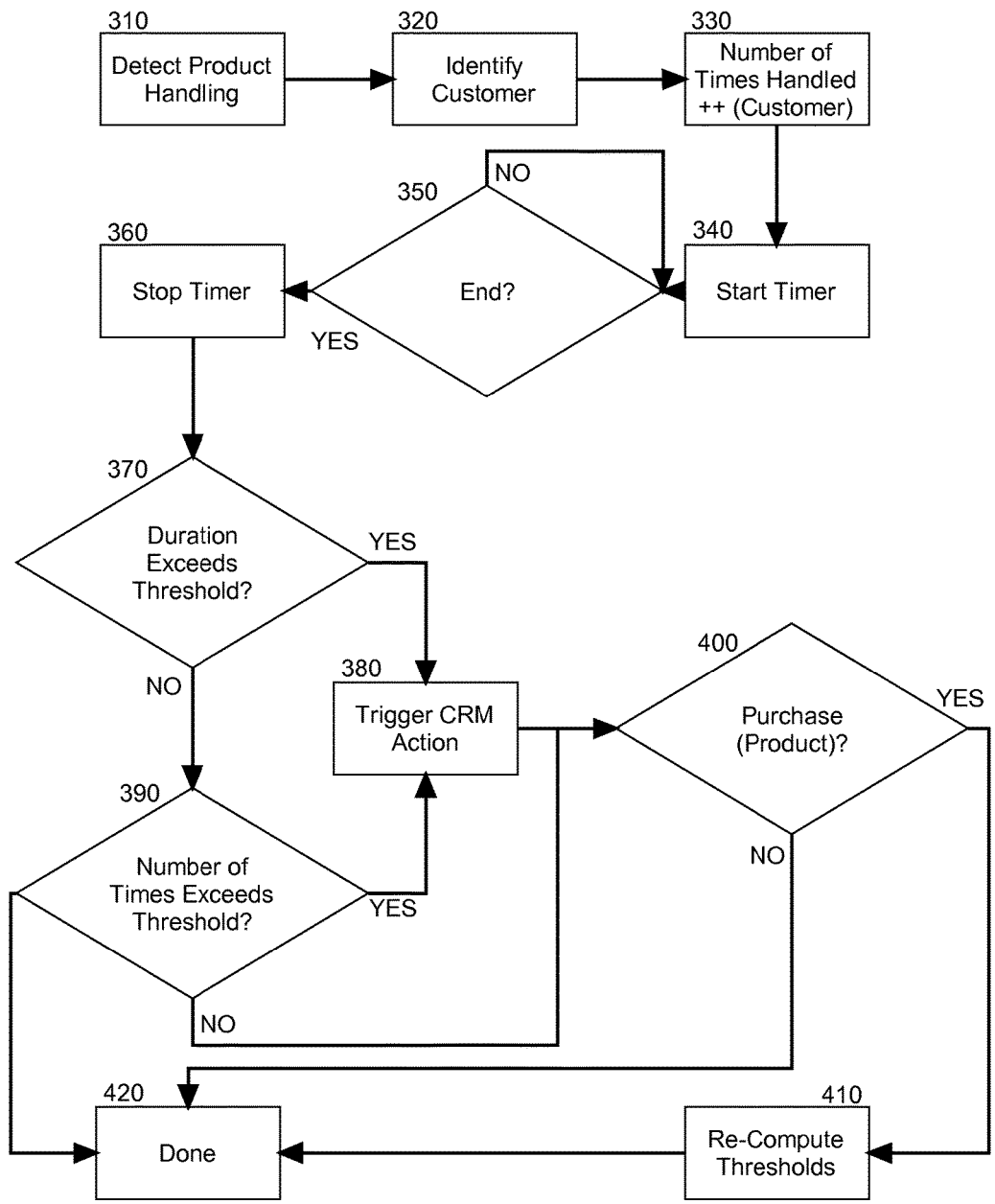

In even yet further illustration of the operation of the customer-product interaction drive CRM module 300, FIG. 3 is a flow chart illustrating a process for customer-product interaction driven CRM. Beginning in block 310, an indication that a unit of product is handled by a customer can be received for processing. The customer can be identified in block 320, for instance by way of a notification of a mobile device broadcasting its geographic presence in close proximity to the unit of product. In block 330, a number of times the identified customer has previously handled the product can be incremented and in block 340, a timer can start so as to measure a duration of time that the unit of product is handled by the customer. In decision block 350, if the product is determined to no longer being handled by the identified customer, in block 360, the timer can stop.

In decision block 370 it can be determined if the duration of time exceeds a threshold value. If so, in block 380 a CRM action can be triggered. Likewise, in decision block 390, it can be determined if the product has been handled previously by the identified customer for a threshold number of times. If so, in block 380 a CRM action can be triggered. In any event, in decision block 400 it can be determined if the identified customer has purchased a unit of the product. If so, in block 410, a value for an average number of time any customer has handled the product prior to purchase can be updated based upon the measured duration of time. Likewise, in block 410, a value for an average number of times any customer has handled the product prior to purchase can be updated based upon the number of times the identified customer had previously handled the product.

In both cases, the threshold values utilized in decision blocks 370 and 390 can be adjusted to be equivalent to the computed values of block 410. Optionally, the threshold value for the duration of time can be set to a value below the computed average of block 410. Alternatively, the threshold value for the duration of time can be set to a value above the computed average of block 410. In the former instance, the threshold value is set to be lower than the average in order to provoke an otherwise unlikely purchase. In the latter instance, the threshold value is set to be higher than the average in order to provoke a purchase that otherwise should have occurred, but did not. In any event, subsequent to block 410, in block 420 the process can end.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A customer-product interaction driven customer relationship management (CRM) method comprising:

detecting, by a CRM application executing in memory of a host computing system, an orientation change of a unit of a product from an original position based upon data values read from an accelerometer affixed to the unit of the product so as to indicate the unit being held by a customer wherein the accelerometer is affixed to the unit of the product is in communication with the host computing system over a computer communications network;

timing, by the CRM application of the host computing system, a duration in which the unit of the product is held by the customer based on the detected orientation change of the unit as detected by the accelerometer affixed to the unit of the product and communicated to the host computing system over the computer communications network;

computing, by the CRM application of the host computing system, for multiple different customers having purchased a similar unit of the product, an average duration of time during which the multiple different customers held the respective similar unit of the product before purchasing the respective similar unit of the product wherein each respective timed duration of each of the different customers is calculated based on the timed duration of the detected orientation change of the similar unit before purchasing the similar unit of the product based upon data values communicated to the host computing system over the communications network by an accelerometer affixed to each respective similar unit of the product so as to indicate the respective similar unit being held by one of the different customers;

setting, by the CRM application of the host computing system, a threshold period of time relative to the average duration of time; and, responsive to the duration exceeding the threshold period of time, executing, by the CRM application of the host computing system, a CRM action in the CRM application with respect to the product and the customer.

2. The method of claim 1, further comprising:

detecting, by the CRM application of the host computing system, a second orientation change of the unit to the original position based upon data values read from the accelerometer affixed to the unit of the product so as to indicate the unit being put back by a customer communicated to the host computing system over the computer communications network;

counting, by the CRM application of the host computing system, a number of times the customer holds the unit of the product over a duration of time based on iterations of the detection of first orientation change and second orientation change of the unit communicated to the host computing system over the computer communications network;

computing, by the CRM application of the host computing system, for multiple different customers having purchased a similar unit of the product, an average number of times the multiple different customers held the similar unit of the product before purchasing the similar unit of the product wherein each number of time is calculated based on iterations of the detection of first orientation change and second orientation change of the similar unit before purchasing the similar unit of the product for each respective customer communicated to the host computing system over the computer communications network;

setting, by the CRM application of the host computing system, a threshold value relative to the average number of times; and, responsive to the number of times exceeding the threshold value, executing, by the CRM application of the host computing system, a CRM action in the CRM application with respect to the product and the customer.

3. The method of claim 1, wherein the threshold period of time is less than the average duration.

4. The method of claim 1, wherein the threshold period of time is more than the average duration.

5. The method of claim 1, wherein the CRM action is a message transmitted to a mobile device associated with the customer.

6. The method of claim 1, wherein the CRM action is a message transmitted to a sales representative geographically proximate to the customer.

7. A CRM data processing system configured for customer-product interaction driven CRM, the system comprising:

a host computing system comprising at least one computer with memory and at least one processor;

a CRM application executing in the memory of the host computing system; and, a customer-product interaction driven CRM module coupled to the CRM application, the module comprising program code that when executes in the memory of the host computing system, detects, by the CRM module, an orientation change of a unit of a product from an original position based upon data values read from an accelerometer affixed to the unit of the product so as to indicate the unit being held by a customer wherein the accelerometer affixed to the unit of the product is in communication with the host computing system over a computer communications network, times, by the CRM module, a duration in which the unit of the product is held by the customer based on the detected orientation change of the unit detected by the accelerometer affixed to the unit of the product and as communicated to the host computing system over the computer communications network, computes, by the CRM module, for multiple different customers having purchased a similar unit of the product, an average duration of time during which the multiple different customers held the respective similar unit of the product before purchasing the respective similar unit of the product wherein each respective timed duration of each of the different customers is calculated based on the timed duration of the detected orientation change of the similar unit before purchasing the similar unit of the product based upon data values communicated to the host computing system over the communications network by an accelerometer affixed to each respective similar unit of the product so as to indicate the respective similar unit being held by one of the different customers, sets, by the CRM module, a threshold period of time relative to the average duration of time; and, responds to the duration exceeding the threshold period of time, by executing, by the CRM module, a CRM action in the CRM application with respect to the product and the customer.

8. The system of claim 7, wherein the program code is further enabled to:
detect, by the CRM module, a second orientation change of the unit to the original position based upon data values read from the accelerometer affixed to the unit of the product so as to indicate the unit being put back by a customer communicated to the host computing system over the computer communications network;
count, by the CRM module, a number of times the customer holds the unit of the product over a duration of time based on iterations of the detection of first orientation change and second orientation change of the unit communicated to the host computing system over the computer communications network;
compute, by the CRM module, for multiple different customers having purchased a similar unit of the product, an average number of times the multiple different customers held the similar unit of the product before purchasing the similar unit of the product wherein each number of time is calculated based on iterations of the detection of first orientation change and second orientation change of the similar unit before purchasing the similar unit of the product for each respective customer communicated to the host computing system over the computer communications network;
set, by the CRM module, a threshold value relative to the average number of times; and,
respond to the number of times exceeding the threshold value, by executing, by the CRM module, a CRM action in the CRM application with respect to the product and the customer.

9. The system of claim 7, wherein the threshold period of time is less than the average duration.

10. The system of claim 7, wherein the threshold period of time is more than the average duration.

11. The system of claim 7, wherein the CRM action is a message transmitted to a mobile device associated with the customer.

12. The system of claim 7, wherein the CRM action is a message transmitted to a sales representative geographically proximate to the customer.

13. A computer program product for customer-product interaction driven customer relationship management (CRM), the computer program product comprising a computer readable storage medium having program instructions embodied therewith, the program instructions executable by a device to cause the device to perform a method comprising:
detecting, by a CRM application executing in memory of a host computing system, an orientation change of a unit of a product from an original position based upon data values read from an accelerometer affixed to the unit of the product so as to indicate the unit being held by a customer wherein the accelerometer is affixed to the unit of the product is in communication with the host computing system over a computer communications network;
timing, by the CRM application of the host computing system, a duration in which the unit of the product is held by the customer based on the detected orientation change of the unit as detected by the accelerometer affixed to the unit of the product and communicated to the host computing system over the computer communications network;
computing, by the CRM application of the host computing system, for multiple different customers having purchased a similar unit of the product, an average duration of time during which the multiple different customers held the respective similar unit of the product before purchasing the respective similar unit of the product wherein each respective timed duration of each of the different customers is calculated based on the timed duration of the detected orientation change of the similar unit before purchasing the similar unit of the product based upon data values communicated to the host computing system over the communications network by an accelerometer affixed to each respective similar unit of the product so as to indicate the respective similar unit being held by one of the different customers;
setting, by the CRM application of the host computing system, a threshold period of time relative to the average duration of time; and,
responsive to the duration exceeding the threshold period of time, executing, by the CRM application of the host computing system, a CRM action in the CRM application with respect to the product and the customer.

14. The computer program product of claim 13, wherein the method further comprises:
detecting, by the CRM application of the host computing system, a second orientation change of the unit to the original position based upon data values read from the accelerometer affixed to the unit of the product so as to indicate the unit being put back by a customer communicated to the host computing system over the computer communications network;
counting, by the CRM application of the host computing system, a number of times the customer holds the unit of the product over a duration of time based on iterations of the detection of first orientation change and second orientation change of the unit communicated to the host computing system over the computer communications network;
computing, by the CRM application of the host computing system, for multiple different customers having purchased a similar unit of the product, an average number of times the multiple different customers held the similar unit of the product before purchasing the similar unit of the product wherein each number of time is calculated based on iterations of the detection of first orientation change and second orientation change of the similar unit before purchasing the similar unit of the product for each respective customer communicated to the host computing system over the computer communications network;
setting, by the CRM application of the host computing system, a threshold value relative to the average number of times; and,
responsive to the duration exceeding the threshold period of time, executing, by the CRM application of the host computing system, a CRM action in the CRM application with respect to the product and the customer.

15. The computer program product of claim 13, wherein the threshold period of time is less than the average duration.

16. The computer program product of claim 13, wherein the threshold period of time is more than the average duration.

17. The computer program product of claim 13, wherein the CRM action is a message transmitted to a mobile device associated with the customer.

18. The computer program product of claim 13, wherein the CRM action is a message transmitted to a sales representative geographically proximate to the customer.

* * * * *